(12) United States Patent
Iskiyan et al.

(10) Patent No.: US 7,167,941 B2
(45) Date of Patent: Jan. 23, 2007

(54) MULTI-PORT DEVICE CONFIGURATION

(75) Inventors: Peter I. Iskiyan, Phoenix, AZ (US); Joseph A. Schaefer, Chandler, AZ (US); Gary A. Solomon, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 408 days.

(21) Appl. No.: 10/659,963

(22) Filed: Sep. 10, 2003

(65) Prior Publication Data
US 2005/0055484 A1    Mar. 10, 2005

(51) Int. Cl.
*G06F 13/00* (2006.01)
(52) U.S. Cl. .................... 710/316; 710/104; 710/8; 710/16
(58) Field of Classification Search ............ None
See application file for complete search history.

(56) References Cited

U.S. PATENT DOCUMENTS 6,393,486 B1    5/2002    Pelavin et al.

2004/0128410 A1*    7/2004    Mayhew et al. ............ 710/30
2004/0267948 A1*    12/2004    Oliver et al. ............ 709/230

FOREIGN PATENT DOCUMENTS

WO    WO 03/019391 A2    3/2003

OTHER PUBLICATIONS

Notification Of Transmittal Of The International Search Report And The Written Opinion Of The International Searching Autority, Or The Declaration for PCT/US2004/028731, mailed Jun. 10, 2005, 12 pages.
Wong, William, Advanced Switching For PCI Express: The Future Looks "Fabric" Fast, Electronic Design, Hayden Pub. Co., New York, NY, U.S.; vol. 51, No. 14, Jun. 23, 2003, pp. 36, 38, XP 001163039, ISSN: 0013-4872.

* cited by examiner

*Primary Examiner*—Glenn A. Auve
(74) *Attorney, Agent, or Firm*—Blakely, Sokoloff, Taylor & Zafman LLP (57) ABSTRACT

A method and an apparatus to configure a multi-port device are disclosed. The method includes defining a first set of pointers, one for each port of the multi-port device, and storing the first set of pointers in one or more capability structures of the multi-port device.

24 Claims, 7 Drawing Sheets

Configuration Registers

Example Configuration Capability Structure
of a Multiport Device

FIG. 2B

Example Configuration Capability Structure of a Multi-port Device

FIG. 2C

Capability Structure List

MULTI-PORT DEVICE CONFIGURATION

FIELD OF INVENTION

Embodiments of the present invention relate to computer systems, and more particularly, to configuration of multi-port devices in a computer system.

BACKGROUND

A computer system typically includes a processor and a chipset. The chipset may include one or more switches linking peripheral components via a number of buses to the processor. Peripheral Component Interconnect ("PCI") is a standard developed to provide a data path between the peripheral components within the system. As the speed of processors advances, standards that provide high-speed data path within a computer system are developed, such as PCI-X and PCI Express™.

A PCI Express™ compatible switch with multiple ports appears to PCI compatible enumeration and configuration software as a two level hierarchy of PCI-to-PCI bridges. Each switch port appears to the configuration software as a distinct PCI-to-PCI bridge. Each port can support up to eight sub-functions, each sub-function potentially introducing a linked list of supported capabilities. Among the ports, there is an upstream port. The upstream port, which appears to software as a PCI-to-PCI bridge, is the only port through which PCI compatible software can read and/or write the internal configuration registers of the switch. All other ports of the switch, referred to as downstream ports, appear as distinct PCI-to-PCI bridges to the configuration software. As a result, a two-level hierarchy of PCI-to-PCI bridges is formed.

Figure 1:
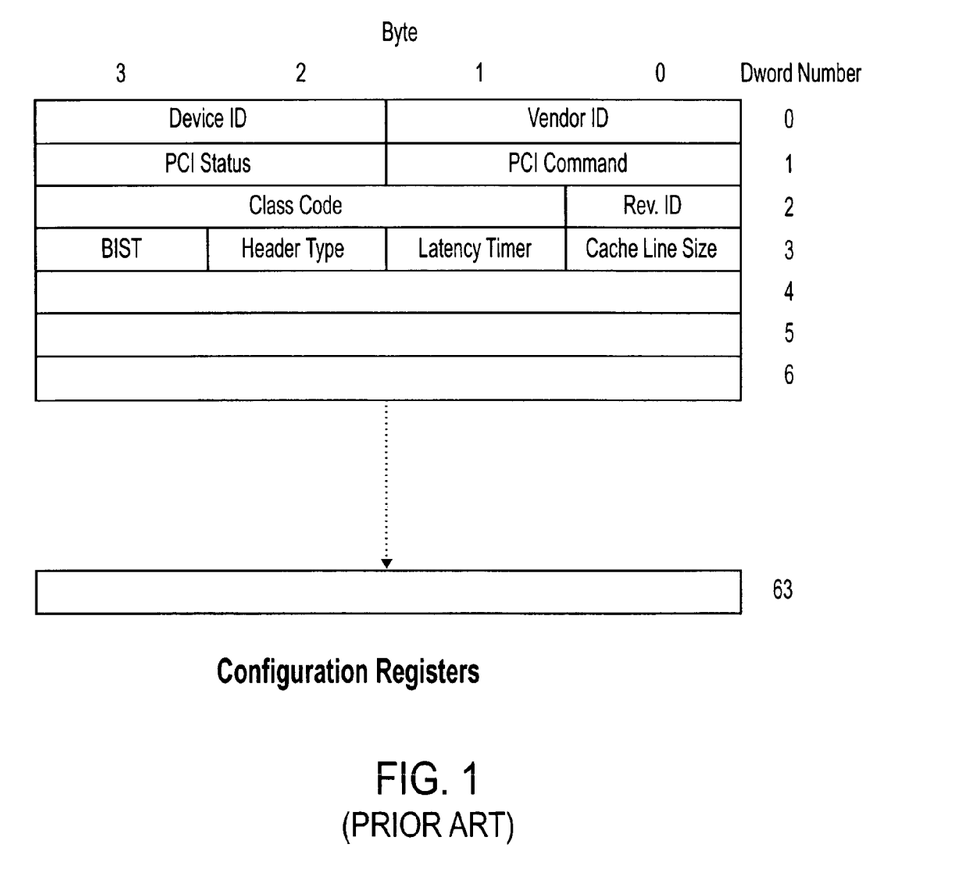
FIG. 1 shows an example of a set of configuration registers (PCI example).

To configure the switch, the configuration software reads a configuration record stored in a set of configuration registers and writes to some of the configuration registers. An example of a configuration record stored in a set of configuration registers is shown in FIG. 1. The size of the configuration registers is constrained by the address of the configuration registers, which is 8-bit wide. Therefore, the set of configuration registers is limited to storing $2^8$ bytes, i.e., 256 bytes of information, such as vendor ID, PCI status, class code, etc.

Since every port of the switch, including the upstream port, appears as a distinct PCI-to-PCI bridge, each port is represented by its own separate and distinct configuration register space. To support an additional port in the switch, one has to create an additional PCI-to-PCI bridge with its associated configuration register space. Creating a configuration register space for every port adds additional silicon cost and complexity to switch components.

BRIEF DESCRIPTION OF THE DRAWINGS

Embodiments of the present invention will be understood more fully from the detailed description that follows and from the accompanying drawings, which however, should not be taken to limit the appended claims to the specific embodiments shown, but are for explanation and understanding only.

DETAILED DESCRIPTION

A method and an apparatus to configure a multi-port device are described. In the following description, numerous details are set forth, such as specific configurations, data sizes, buffer capacities, etc., in order to provide a thorough understanding of this description. It will be clear, however, to one of ordinary skill in the art, that these specific details may not be needed to practice every embodiment of the present invention.

Some portions of the detailed descriptions, which follow, are presented in terms of symbolic representations and descriptions of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The operations and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the disclosure herein.

A machine-readable medium includes any mechanism for storing or transmitting information in a form readable by a machine (e.g., a computer). For example, a machine-readable medium includes ROMs, RAMs, magnetic disk storage media, optical storage media, flash memory devices, etc.

Figure 2A:
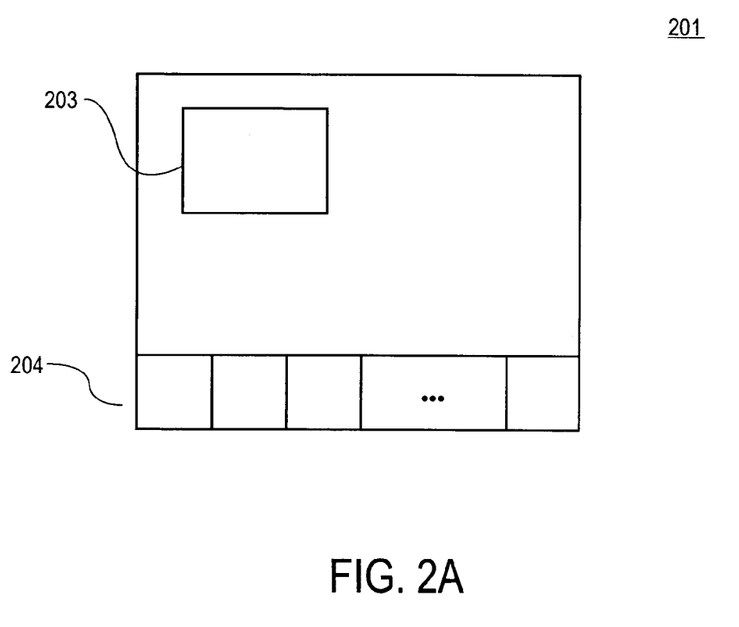
FIG. 2A shows one embodiment of a multi-port device.

FIG. 2A shows an embodiment of a multi-port device 201. In one embodiment, the multi-port device is an Advance Switching component, which is herein referred to as an AS switch. AS is a switching fabric architecture that supports capabilities that include hot add/remove, redundant pathways, and fabric management failover, etc. Moreover, AS supports direct communication between any number of endpoint devices or nodes, direct unicast communication between any two nodes in a computer system, and multicast communication between a source node and multiple designated destination nodes. The multi-port device 201 includes a number of ports 204 and a configuration space storage device 203. The configuration space storage device 203 stores configuration structures for the ports 204. In one embodiment, the configuration space storage device 203 includes registers comprising flip-flops. In another embodiment of an AS switch, the configuration space storage device is a dynamic RAM device ("DRAM"). Alternatively, a software implementation may be used. For example, in one embodiment, the configuration space is stored in data structures defined by software.

Figure 2B:
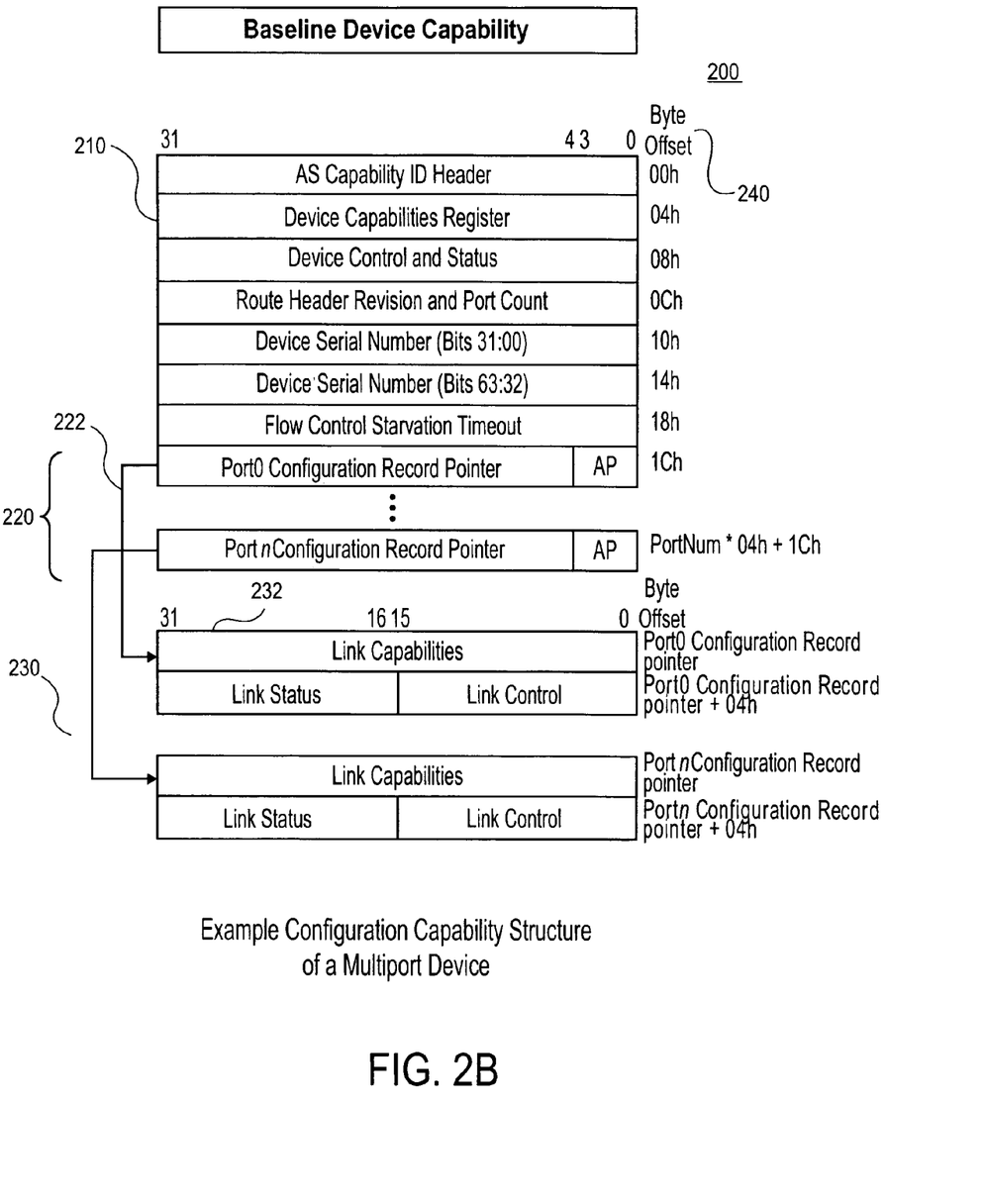
FIG. 2B shows one embodiment of a configuration structure for a multi-port device.

FIG. 2B shows an embodiment of a configuration capability structure of an AS switch. The configuration capability structure 200 includes a capability structure 210. In one embodiment, the capability structure 210 stores information on the attributes in common with all of the switch's ports for the function described by a given capability. Addresses of information stored within the capability structure 210 are referenced with offsets 240 with respect to the beginning of the capability structure 210. In one embodiment, the capability structure 210 stores AS Capability ID Header at offset 00h, Device Capabilities Register at offset 04h, Device Control and Status at offset 08h, Routing Header Revision and Port Count at offset 0Ch, Device Serial Number at offset 10h, and the Flow Control Starvation Timeout at offset 18h. In one embodiment, part of the configuration space is reserved for future use. For example, portions of the Device Capabilities Register at offset 04h in FIG. 2B contain reserved bit fields.

In addition, the capability structure 210 stores a set of pointers 220. Each of the pointers 220 is designated to a distinct AS switch port supported. In one embodiment, eight pointers are defined for a switch with eight ports. In another embodiment, 32 pointers are defined for a switch with 32 ports.

In one embodiment, a number of per-port capability structures 230 are provided. In one embodiment, a per-port capability structure is a data structure for storing programmable elements representing capabilities supported by a port. The programmable elements stored in the per-port capability structures 230 are organized according to the capability. For example, Port 0 supports Link Capabilities, which are capabilities specific to the data link of the multi-port device, and the pointer 222 of Port 0 points to the per-port capability structure 232 corresponding to Port 0. The per-port capability structure 232 stores the programmable elements of Link Capabilities, namely the link status and the link control. In other embodiments, the capability structures 230 store programmable elements of other supported capabilities, such as error reporting and virtual channeling.

Moreover, it may be unnecessary to define a separate capability structure for each of the ports of the switch supporting the same capability. In one embodiment, two ports of a switch support substantially the same capability, and therefore, the pointers of these ports point to the same capability structure. Eliminating the need to define a separate capability structure for each port saves storage for configuration data. Furthermore, pointers simplify configuration of the device because it is unnecessary to define and maintain a separate capability structure for every port.

Figure 2C:
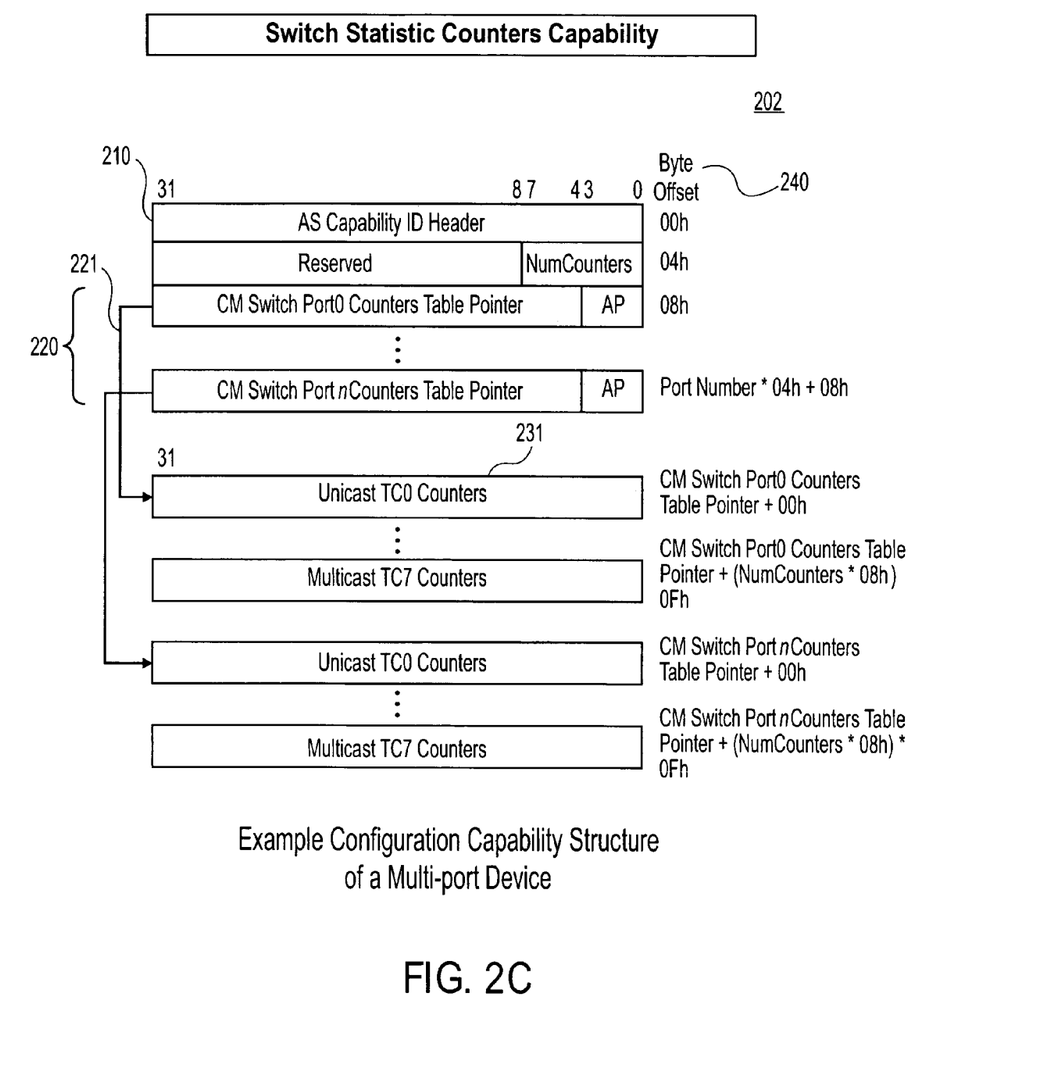
FIG. 2C shows another embodiment of a configuration structure for a multi-port device.

FIG. 2C shows an alternate embodiment of a configuration capability structure 202 of an AS switch with n ports. The configuration capability structure 202 stores similar information on the attributes of the AS switch as the configuration capability structure 200 in FIG. 2B. Addresses of information stored within the capability structure 210 are referenced with offsets 240 with respect to the beginning of the capability structure 210. In addition to the information on the attributes, the capability structure 210 stores n pointers, one for each port of the switch. Pointer 221 is designated to Port 0. Port 0 supports direct unicast communication. Therefore, the pointer 221 points to a capability structure 231 storing programmable elements of direct unicast communication.

Figure 3:
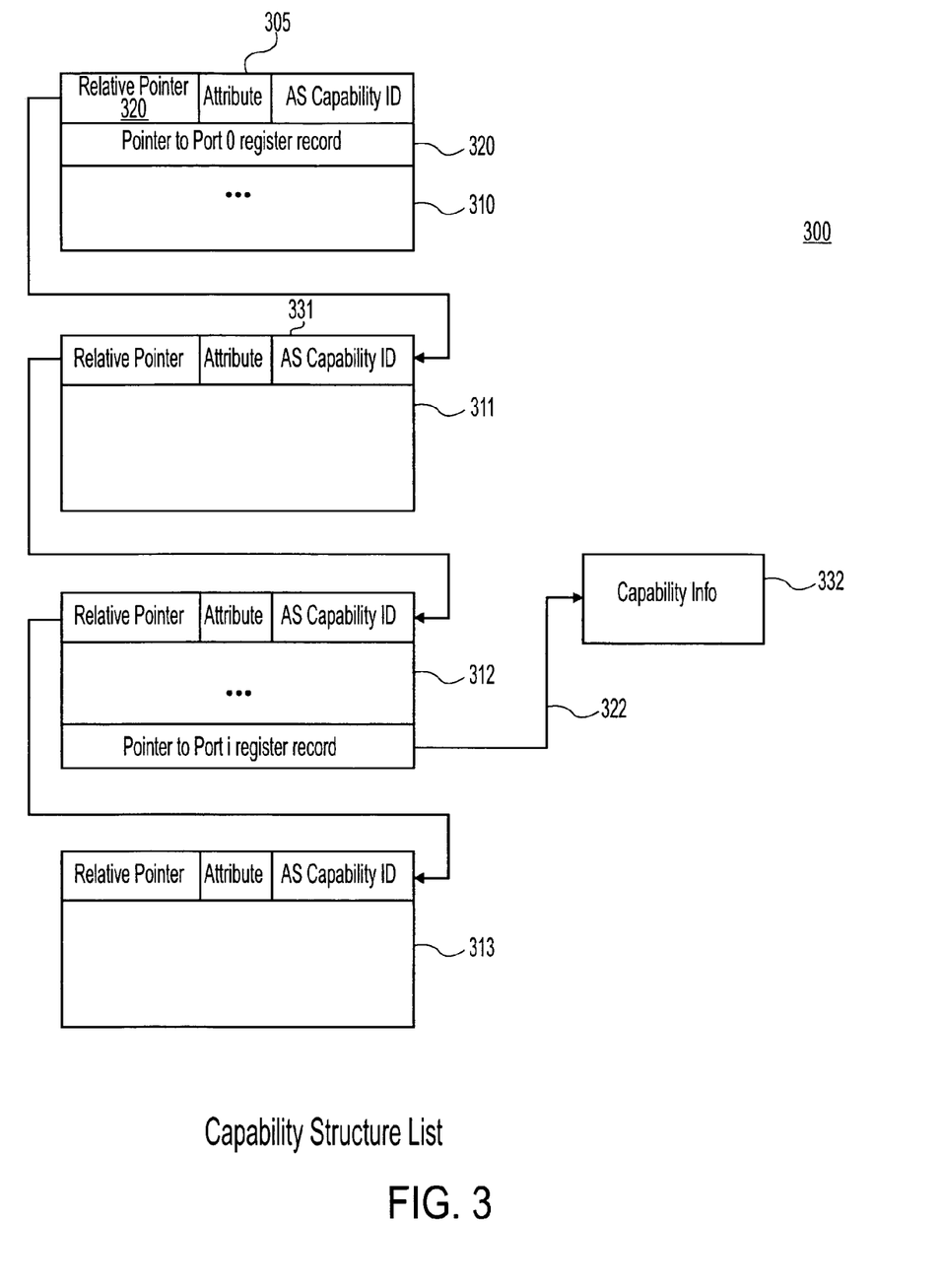
FIG. 3 shows an exemplary embodiment of a capability structure list.

In one embodiment, there are multiple capability structures in the component configuration space, such as, for example, 2, 5, 8, etc. FIG. 3 shows an embodiment of a configuration space of a switch having four capability structures 310–313. The capability structures 310–313 are arranged in a capability structure list 300. The capability structures store the attributes 305 of the switch and a number of pointers, one for each port of the switch. For example, pointer 320 is for port 0.

To build the capability structure list 300 shown in FIG. 3, in one embodiment, a relative pointer is stored in one capability structure to point to a second capability structure. For example, the relative pointer 320 is stored in the capability structure 310 to point to the Advance Switching Capability ID 331 of the capability structure 311. The relative pointer 320 stores an offset between the address of the capability structure 310 and the address of the capability structure 311. In one embodiment, the relative offset is stored as an 8-bit value. In another embodiment, an absolute offset is used instead of a relative offset. The absolute offset represents the difference between the starting address of the configuration space and the beginning address of the capability structure 311. Therefore, if the absolute offset is 8-bit, then the highest address of a capability structure is limited to the beginning address of the configuration space plus $2^8$, which is 256. In other words, the configuration storage space is limited to 256 bytes when an absolute offset of 8-bits is used. This limitation does not apply to the embodiments using a relative offset, which represents the address offset between two consecutive capability structures.

As described above, each capability structure has a set of pointers designated to a number of ports of the switch. Each of the pointers point to a per-port capability structure storing programmable elements of capabilities supported by the port. To avoid obscuring the embodiment in FIG. 3, only one pointer 322 and one capability structure 332 are shown to illustrate the concept. It should be appreciated that each capability structure stores one or more pointers, and each pointer points to a related per-port capability structure. Furthermore, the configuration space has one or more capability structures. For example, in FIG. 3, pointer 322 stored in the capability structure 312 is designated to Port i of the switch. Pointer 322 points to the per-port capability structure 332, which stores capability information of Port i.

Linking additional capability structures with pointers also provides a convenient way to support additional ports of the switch. Instead of creating a configuration space for each additional port supported, one can simply add a pointer designated to the additional port to the list of pointers in a capability structure of a capability structure list. When the number of ports supported by a component exceeds current capability structure implementations, it will be trivial to define new versions of a given capability structure to accommodate the higher port counts.

Figure 4:
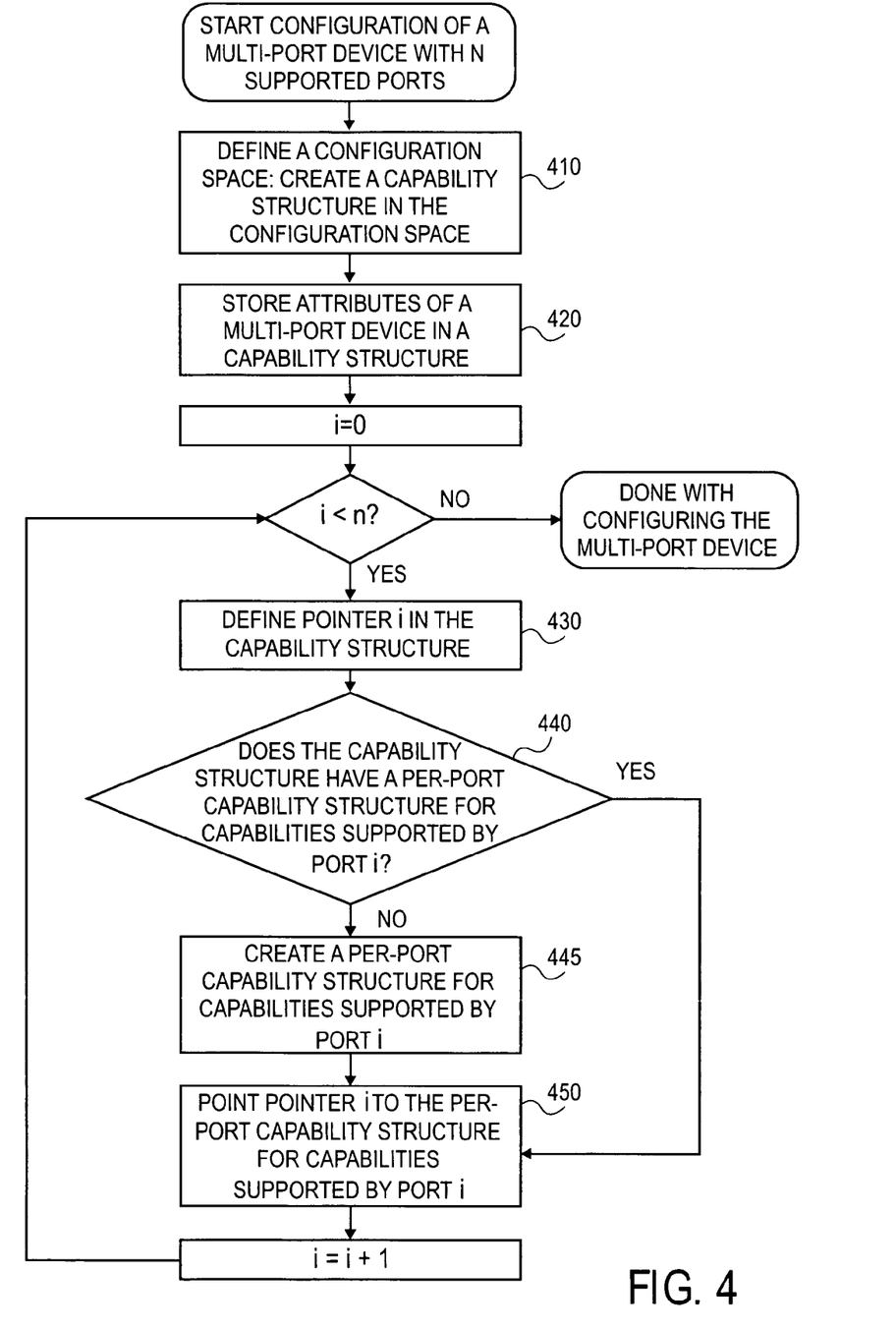
FIG. 4 shows a flow diagram of an embodiment of a process for configuring a multi-port device.

FIG. 4 shows a flow diagram of one embodiment of a process for configuring a multi-port device. The process is performed by processing logic that may comprise hardware (e.g., circuitry, dedicated logic, etc.), software (such as is run on a general purpose computer system or a dedicated machine), or a combination of both.

In one embodiment, the multi-port device has n ports. Processing logic creates a configuration space for the multi-port device (processing block 410). Processing logic further defines a capability structure within the configuration space. Processing logic stores attributes of the multi-port device in the capability structure (processing block 420). For each port of the multi-port device, processing logic defines a pointer in the capability structure (processing block 430). Then processing logic checks the configuration space for a per-port capability structure storing programmable elements of the capabilities supported by the port (processing block 440). If such a capability structure already exists in the configuration space, then processing logic sets the pointer to point to this per-port capability structure (processing block 450). Otherwise, processing logic creates a new capability structure to store the programmable elements of the capabilities supported by the port (processing block 445) and then sets the pointer to point to the new per-port capability structure (processing block 450). Processing logic repeats the defining of pointer for another port and, if necessary, defining a per-port capability structure for the port, until every supported port has a pointer and a per-port capability structure defined.

In one embodiment, processing logic creates an additional capability structure in the configuration space to store additional features or functions supported by the multi-port device. Processing logic links the additional capability structure to the preceding capability structure via a relative pointer stored on the preceding capability structure. The linked capability structures form a capability structure list as shown in FIG. 3. The number of capability structures varies in different embodiments depending on the number of features or functions supported by multi-port devices and by the number of ports implemented on a given multi-port device.

Figure 5:
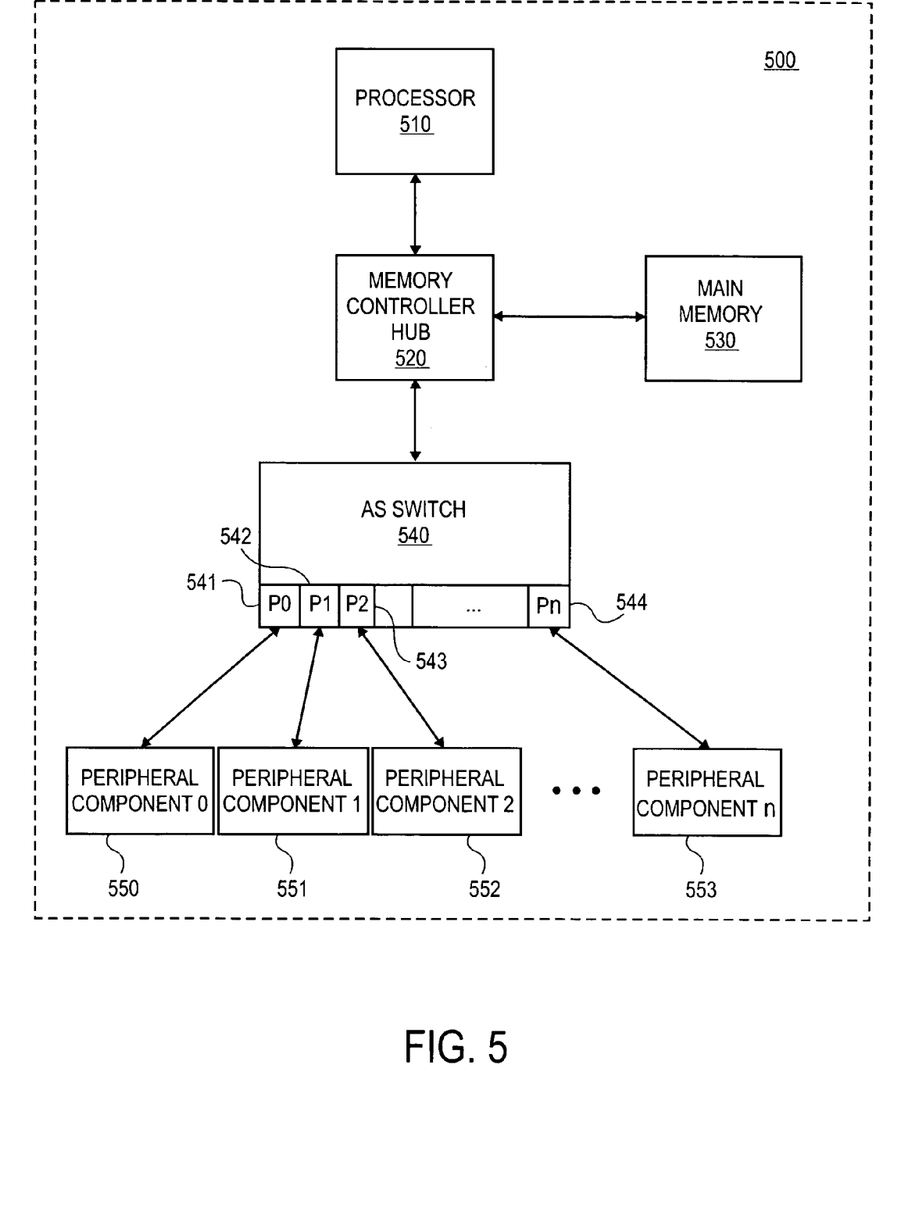
FIG. 5 shows one exemplary embodiment of a computer system.

FIG. 5 shows an exemplary embodiment of a computer system 500. In one embodiment, the system 500 adopts Advance Switching architecture. The system 500 in FIG. 5 includes a processor 510, a memory controller hub 520, a main memory 530, an Advance Switching component 540 (hereinafter, "AS switch"), and a number of peripheral components 550–553. The processor 510, the main memory 530, and the AS switch 540 are coupled to the memory controller hub 520. The peripheral components 550–553 are coupled to the AS switch 540. Through the AS switch 540, the peripheral components 550–553 communicate with each other, as well as the processor 510 and the main memory 530.

The main memory 530 in FIG. 5 is an example of a machine-readable medium. One of ordinary skill in the art should recognize that there are other embodiments of a machine-readable medium. A machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM); random access memory (RAM); magnetic disk storage media; optical storage media; flash memory devices; etc.), etc.

In one embodiment, the main memory 530 stores instructions to configure the AS switch 540. The AS switch 540 includes a number of ports 541–544. The number of ports varies in different embodiments. In one embodiment, the AS switch 540 has 3 ports. In another embodiment, the AS switch 540 has 8 ports. Peripheral components are connected to the ports on the AS switch. For example, peripheral component 0 550 is connected to port P0 541. To configure the AS switch 540, a configuration space is defined. A capability structure is created within the configuration space. A set of pointers is stored in the capability structure. Each of the pointers is designated to a port of the AS switch. The configuration space further includes a number of capability structures to store a number of programmable elements representing various capabilities supported. The programmable elements in the capability structures are organized according to capability. The pointer(s) in the capability structures for a port of the AS switch points to a per-port capability structure storing the programmable elements representing the capabilities supported by the port.

To support additional ports in the AS Switch, one simply has to define additional pointers in the capability structure. If the programmable elements of the capabilities supported by the additional ports are already stored in any of the existing capability structure, the additional pointers are set to point to the existing capability structure. Otherwise, additional capability structures are defined to store the programmable elements of the capabilities supported by the additional ports, and the additional pointers are set to point to these additional capability structures. Using pointers and capability structures to configure ports of a switch provides flexibility in configuration because a pointer can be readily added to the capability structure to support additional ports and the capability structures may be shared among the pointers when some of the ports support substantially the same capabilities.

The foregoing discussion merely describes some exemplary embodiments of the present invention. One skilled in the art will readily recognize from such discussion, the accompanying drawings and the claims that various modifications can be made without departing from the spirit and scope of the appended claims. The description is thus to be regarded as illustrative instead of limiting.

What is claimed is:

1. A method to configure a multi-port device comprising:
defining a first plurality of pointers, one pointer for each of a plurality of ports of the multi-port device; and
storing the first plurality of pointers in one or more capability structures of the multi-port device.

2. The method of claim 1, further comprising coupling the one or more capability structures with a second plurality of pointers.

3. The method of claim 2, wherein the second plurality of pointers comprise relative pointers.

4. The method of claim 1, further comprising:
storing a plurality of programmable elements representing a plurality of capabilities in a plurality of capability structures, wherein the programmable elements are organized according to capability; and
pointing each of the first plurality of pointers to a distinct one of the plurality of capability structures.

5. The method of claim 4, further comprising pointing two of the first plurality of pointers corresponding to two of the plurality of ports to one of the plurality of capability structures if the two ports support the same capability.

6. The method of claim 1, wherein the multi-port device is an Advance Switching component.

7. A machine-readable medium that provides instructions that, if executed by a processor, will cause the processor to perform operations to configure a multi-port device, the operations comprising:
defining a first plurality of pointers, one pointer for each of a plurality of ports of the multi-port device; and
storing the first plurality of pointers in one or more capability structures of the multi-port device.

8. The machine-readable medium of claim 7, wherein the operations further comprise coupling the one or more capability structures with a second plurality of pointers.

9. The machine-readable medium of claim 8, wherein the second plurality of pointers comprise relative pointers.

10. The machine-readable medium of claim 7, wherein the operations further comprise:
storing a plurality of programmable elements representing a plurality of capabilities in a plurality of capability structures, wherein the programmable elements are organized according to capability; and
pointing each of the first plurality of pointers to a distinct one of the plurality of capability structures.

11. The machine-readable medium of claim 7, wherein the multi-port device is an Advance Switching component.

12. An apparatus comprising:
a plurality of ports; and
a storage device to store one or more capability structures, wherein the one or more capability structures store a first plurality of pointers, one pointer for each of the plurality of ports.

13. The apparatus of claim 12, wherein the one or more capability structures comprise more than one capability structures coupled to each other via a second plurality of pointers.

14. The apparatus of claim 13, wherein the second plurality of pointers comprise relative pointers.

15. The apparatus of claim 12, wherein the storage device further stores a second plurality of capability structures to store a plurality of programmable elements representing a plurality of capabilities, the plurality of programmable elements are organized according to capability, each of the first plurality of pointers is pointed to a distinct one of the second plurality of capability structures.

16. The apparatus of claim 15, wherein two of the first plurality of pointers corresponding to two of the plurality of ports are pointed to one of the second plurality of capability structures if the two ports support the same capability.

17. The apparatus of claim 12, wherein the plurality of ports includes one or more Advance Switching ports.

18. A computer system comprising:
a graphics chip; and
a multi-port device coupled to the graphics chip, the multi-port device comprising
a plurality of ports; and
a storage device to store a plurality of capability structures, wherein the plurality of capability structures store a first plurality of pointers, one pointer for each of the plurality of ports.

19. The computer system of claim 18, wherein the plurality of capability structures are coupled to each other via a second plurality of pointers.

20. The computer system of claim 19, wherein the second plurality of pointers comprise relative pointers.

21. The computer system of claim 18, wherein the storage device further stores a second plurality of capability structures to store a plurality of programmable elements representing a plurality of capabilities, the plurality of programmable elements are organized according to capability, each of the first plurality of pointers is pointed to a distinct one of the second plurality of capability structures.

22. The computer system of claim 21, wherein two of the first plurality of pointers corresponding to two of the plurality of ports are pointed to one of the second plurality of capability structures if the two ports support the same capability.

23. The computer system of claim 18, wherein the plurality of ports includes one or more Advance Switching ports.

24. The computer system of claim 18, further comprising a processor.

* * * * *